M. Snell,
Making Staves.

Nº 31,831.                    Patented Mar. 26, 1861.

Witnesses.                    Inventor.

UNITED STATES PATENT OFFICE.

MINARD SNELL, OF MEDINA, NEW YORK.

STAVE-MACHINE.

Specification of Letters Patent No. 31,831, dated March 26, 1861.

*To all whom it may concern:*

Be it known that I, MINARD SNELL, of Medina, in the county of Orleans and State of New York, have invented certain new and useful Improvements in Machinery for Sawing Staves, &c.; and I do hereby declare that the following is a full, clear, and exact description thereof, reference being had to the accompanying drawings, making a part of this specification, in which—

Figure 1:
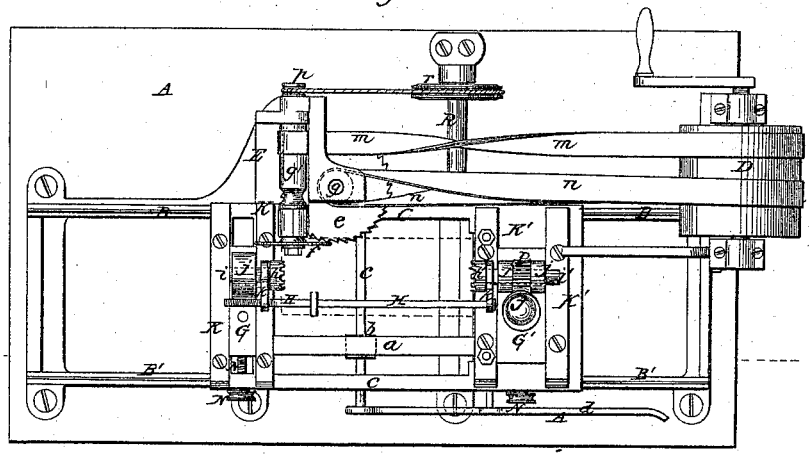
Figure 2:
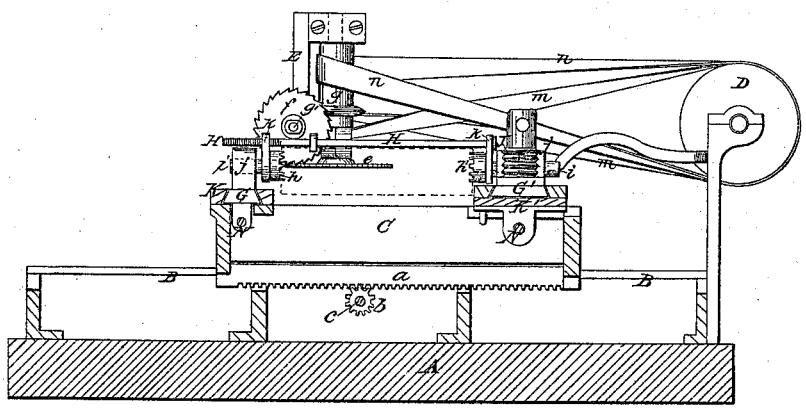

Figure 1 is a plan view of the improved sawing machine. Fig. 2 is a side elevation of the sawing apparatus and a vertical longitudinal section through the carriage and carriage ways.

Similar letters of reference indicate corresponding parts in both figures.

This invention relates to certain improvements in circular saw mills for sawing round logs into boards, staves, etc., wherein two circular saws are employed, one cutting at right angles to the other, thereby sawing a board or stave from the log of the proper width and thickness at one and the same operation.

The object of the present invention is to secure logs or sections of logs of various lengths and diameters between two adjustable centers, or dogs, which have their bearings on the head blocks of the carriage, and are so constructed and arranged that a log may be rotated, and also adjusted laterally up to the saws, as will be hereinafter described, in a rapid and simple manner.

To enable those skilled in the art to make and use my invention I will proceed to describe its construction and operation.

A. is the bed or flooring on which the sawing machine rests, and B. B'. are the two longitudinal rails on which carriage C. travels. These rails B. B'. are parallel to each other and their upper edges are beveled so as to receive and fit into V shaped grooves on the bottom of carriage C. to keep this carriage in its proper place on the rails or carriage ways.

Carriage C. has a rack $a$, extending longitudinally through it which is secured to the bottom of each end of this carriage; into the teeth of this rack $a$, engage the teeth of a small driving pinion wheel $b$, this wheel $b$, will thus give an endwise movement to the carriage C. when it is rotated. Wheel $b$, is keyed to transverse shaft $c$, which receives motion from the main driving pulley D. through belts and pulleys.

The shaft $c$, and pinion $b$, receive motion continually while the machine is in operation, but a continued motion is not communicated to the carriage C. as it is only desirable to communicate motion to this carriage C. when the saws are operating upon the work, therefore the outer end of shaft $c$, passes through a vertical slot in one of the carriage ways, and has its end bearing in the end of lever $d$, which extends along on the outside of rail B'. By moving this lever $d$, the pinion wheel $b$, can be thrown into or out of gear with the rack $a$.

E. is the saw carrying frame, and this frame is provided with suitable bearing boxes for carrying the arbors of the two circular saws $e$, $f$. The saw $e$, is secured on the lower end of the vertical arbor $g$, and the saw $f$, is secured on one end of the horizontal arbor $g'$. The two saws $e$, and $f$, are therefore in planes perpendicular to each other, and these saws cut the staves from the log as the carriage C. is moved up. The saw $e$, cuts into the log the thickness of a stave, and saw $f$, cuts into the log the width of a stave, both saws together cut the stave completely from the log at one and the same operation.

The log is secured in the carriage C. between two centers or dogs $h$, $h'$, and the axis of the log should be so adjusted with relation to the horizontal saw $e$, that this saw will cut toward the heart of the log; the axes of the dogs $h$, $h'$, are therefore in the same horizontal plane as the saw $e$. The shafts $i$, $i'$, of the two centering dogs $h$, $h'$, pass loosely through suitable bearing blocks $j$, $j$, on the transverse sliding head blocks G. G'. and these shafts allow the dogs $h$, $h'$, to be moved endwise. For giving the endwise movement to dogs $h$, $h'$, two arms $k$, $k$, are pivoted to the shafts $i$, $i'$, just behind the heads of the dogs $h$, $h'$, and through the ends of these arms $k$, $k$, passes a screw shaft H. which, on being turned in one direction, will forcibly draw the dogs toward each other, and by turning this shaft H. in an opposite direction it will cause the dogs to be moved away from each other simultaneously. The shaft $i'$, of dog $h'$, has a groove cut into its surface in a direction with its axis, and this groove receives a tenon projecting from spur wheel P. and secures this spur wheel to the shaft $i'$, in such a manner that the shaft will be allowed an end play, and at the same time may be rotated by turning the spur wheel P. Wheel P. is turned by means of the perpendicular worm screw shaft J. which projects up from the sliding head block G'.

The head blocks G. G'. work in dove-tail guides in their blocks K. K'. and are moved by the adjusting screws N. N. in the usual manner. The block K'. carrying the head block G'. is made adjustable in a direction with the length of the carriage C. the other block K. is fixed permanently to the carriage C.

The arbor $g'$, of saw $f$, receives motion from the large driving drum D. through belt $m$, and the arbor $g$, of saw $e$, is driven by a belt $n$, also passing over drum D. The arbor $g'$, of saw $f$, carries a small grooved wheel $p$, on the opposite end to the saw $f$, and this small pulley gives motion to a large grooved pulley $r$, on shaft R. The diameters of these pulley wheels $p$, and $r$, are so regulated that the carriage $c$. will be moved with a proper relative speed to the saws $e$, and $f$. Shaft R. transmits motion to the shaft $c$, through pulleys and a belt not represented in the drawings.

The operation of the machine above described is as follows. Motion is communicated to the main driving drum D. and this motion is transmitted to saws $e$, and $f$, by their respective belts $m$, and $n$. Arbor $g'$, gives motion to shaft R. and this shaft gives a slow motion to shaft $c$, through the medium of belts and large and small pulleys before described. The lever $d$, is moved so as to depress the shaft $c$, and thus throw spur wheel $b$, out of gear with the rack $a$, on carriage C. The carriage C. is now moved by hand back to one end of the carriage way B. B'. for receiving the log or section of a log which is to be cut up into staves. The log is now adjusted between the dogs $h$, $h'$, so that its axis will be in a line with the axes of said dogs, thus bringing the axis of the log in a horizontal plane with saw $e$. Rod H. is now turned and the screw on this rod will draw the dogs toward each other and force the spiked ends of the dogs deeply into the ends of the log and secure the log firmly between them. The log being thus secured to carriage C. the sliding blocks G. G'. are moved laterally by turning screws N. N. and the log is properly adjusted up to the saws $e$, and $f$. The carriage C. is now moved forward and the work is presented to the saws, by throwing wheel $b$, in gear with rack $a$. When one stave has been cut from the log the wheel $b$, is again thrown out of gear with the rack $a$, and the carriage is pushed back to the opposite end of the ways B. B'. to repeat the operation, but before the log is again presented to the saws the shaft J. is rotated in the proper direction to turn the log the distance of the thickness of a stave, the saws then cut off this stave when the carriage is again moved forward. In this manner the staves are cut from the circumference of the log, the log being turned the thickness of a stave for every forward movement of the carriage, and when the log has thus made one revolution about its axis, it must be moved laterally up to the saws the proper distance for the saws to cut the staves the proper width.

The operation, as above described, of sawing staves from the log is again repeated, and the log is cut up into staves of the proper width and thickness, the saw $e$, cutting toward the center of the log during the whole operation.

Having thus described my invention what I claim as new and desire to secure by Letters Patent, is—

The centering dogs $h$, $h'$, spur wheel P. and worm shaft J. in combination with the pivoted arms $k$, $k$, and adjusting rod H. the same being arranged on the sliding head blocks G. G'. and constructed substantially as herein set forth, for the purpose described.

MINARD SNELL.

Witnesses:
D. W. COLE,
S. G. PURDY.